(12) United States Patent
Young

(10) Patent No.: US 6,377,939 B1
(45) Date of Patent: Apr. 23, 2002

(54) PIPELINED METHOD AND APPARATUS FOR PROCESSING COMMUNICATION METERING DATA

(75) Inventor: Derek M. Young, Brookline, MA (US)

(73) Assignee: Metratech, Waltham, MS (US)

( * ) Notice: Subject to any disclaimer, the term of this patent is extended or adjusted under 35 U.S.C. 154(b) by 0 days.

(21) Appl. No.: 09/304,924

(22) Filed: May 4, 1999

(51) Int. Cl.⁷ .......................... G06F 17/60; G06F 15/80
(52) U.S. Cl. ............................. 705/34; 713/1
(58) Field of Search ...................... 713/1; 709/100–102, 709/104, 105, 201; 712/28, 50; 705/34, 412

(56) References Cited

U.S. PATENT DOCUMENTS

| | | | |
|---|---|---|---|
| 5,691,973 A | 11/1997 | Ramstrom et al. | |
| 5,696,906 A | 12/1997 | Peters et al. | |
| 5,768,521 A | 6/1998 | Dedrick | |
| 5,819,092 A | 10/1998 | Ferguson et al. | |
| 5,930,773 A | * 7/1999 | Crooks et al. | 705/30 |
| 6,018,726 A | * 1/2000 | Tsumura | 705/412 |
| 6,088,659 A | * 7/2000 | Kelley et al. | 702/62 |

OTHER PUBLICATIONS

Ebill.NetBilling Software Accounting Software for Telphone Telecommunications Cable, EbillNet,Inc. website pp. 1–3 at Internet address www.ebill.net/.

Ebill.Net Services and Products Page, EbillNet, Inc. website page at Internet address www.ebill.net/products.htm.

MindSparX, MindSparX Inc. website page at Internet address www.mindsparx.com/splash.html.

Telecommunication's Billing, Billing website pp. 1–2 at Internet address www.sewanee.edu/telcom/billing.html.

CustomCall Data Systems, CustomCall Data Systems website pp. 1–2 at Internet address www.customcall.com/index.html.

\* cited by examiner

*Primary Examiner*—Thomas M. Heckler
(74) *Attorney, Agent, or Firm*—Kudirka & Jobse, LLP

(57) ABSTRACT

For communication services, a metering and processing system for processing metered information incorporates configurable processing modules and a configuration manager. The system can by readily and flexibly configured, responsive to operator directions, to process metered information to meet the needs of data consumers, such as NSPs and ISPs. Each processing module performs a specific sub-part of a computation on the metered information, and the configuration manager generates a configuration file for specifying the order of operation, computation sub-part, and other operational parameters for the individual processing modules.

27 Claims, 10 Drawing Sheets

PIPELINED METHOD AND APPARATUS FOR PROCESSING COMMUNICATION METERING DATA

FIELD OF THE INVENTION

The present invention relates to telecommunication, and more particularly to computer processing of metered information regarding communication services.

BACKGROUND OF THE INVENTION

Known communication billing systems meter usage of telephone services and prepare billing based traditionally on time and distance of telephone calls. While such billing systems met the needs of telephone companies for many years, the telecommunication market is experiencing fundamental changes giving rise to a need for new billing systems, which are more flexible and robust. These changes are driven by worldwide deregulation, privatization, increased competition, and new communications technologies, such as the Internet, and the advent of Internet-Protocol (IP) networks.

With increased competition among aggressive new entrants and diversifying telephone service companies in the burgeoning telecommunication market, margins on voice and other services are under pressure. As a result, network service providers (NSPs) and downstream, independent service providers (ISPs) are looking at ways to differentiate themselves from their competition. One way is to offer value added services packages, often called "products", including, for example, an ever-changing variety of telephone calling plans. Other such value added services include video-on-demand, Web hosting, and streaming media. These value added services are not typically billed like traditional telephony, but rather pursuant to special or even customized billing plans. Special pricing may apply depending on total or aggregate usage, calling "time of day" or "day of the week", or combinations of services purchased. Many value added services are packaged for particular market segments, such as residential, small business or enterprise, and carry different rates depending on segment. Some provide subscribers with a menu of telecommunication services from which to choose, often with a number of billing options for each.

One problem that arises relates to integration of such new value added services into existing billing systems. Traditionally, NSPs used large mainframe computers and custom-designed billing software that typically required months for modification for integration of new value added services and their accompanying billing plans. Such modifications to existing billing systems represented a high overhead, in terms of cost and time, associated with rollout of new value added services. For example, when a major NSP introduced a new telephone plan for residential customers called "Friends and Family™", it enjoyed a nine month lead over its competitors who were delayed in introducing similar products by the time it took to modify their existing billing systems. Lengthy delay in "time to market" can cost NSPs and ISVs significantly in revenue and market share.

New service products arising from new technologies introduce complications as well, because NSPs and ISVs frequently want such services to be bundled with traditional services as a unified package, or, at their option, billed as single or separate products. Traditional billing platforms do not usually provide such flexibility in billing.

Moreover, NSPs and ISVs may wish to meter, monitor usage, and generate usage reports for a variety of reasons other than bill preparation. It may prove useful for NSPs and ISVs to meter services, even though they do not currently bill customers for such services, in order to determine whether they should start billing for such services in the future. For other services, NSP and ISVs may rely on usage-graduated billing plans to charge for excessive network use and thereby discourage potential network bottlenecks. Such billing schemes typically charge users only when usage crosses a preset threshold, and thus such services require metering for comparing actual usage against the threshold.

To illustrate the complexity involved with billing, a universal messaging service may offer fax, voice, video, pager, and email capabilities. Most users would currently assume that everything except email should be metered and billed; email is usually regarded today as "free". Unfortunately, spamming is common practice and email files containing attachments are increasing in size. One can imagine an NSP creating a services billing plan that allows users to send, for example, 5000 emails and 100 MB of traffic per month for free as part of a messaging service, but then apply usage-based charges for anything above those levels. Data volume is a common reason for metering high-volume services.

It would be desirable to provide NSPs and ISPs with flexible billing platforms that enable rapid deployment of new value added service offerings. Such platforms should enable rollout of new services, e.g., within weeks, and new releases, upgrades or updates several times a year without interrupting billing activity. Preferably, such platforms would reduce overhead associated with the rollout, and provide an "end-to-end" solution to billing for such new services.

It would also be desirable to provide a system for enabling NSPs and ISPs to have real-time access to unified billing data based on customer usage of new value added services. This would enable NSPs and ISPs to track customer usage for purposes of business management, and implement appropriate changes to value added services as indicated by the usage data.

SUMMARY OF THE INVENTION

The invention resides in a metering and processing system for processing metered information, which incorporates configurable processing modules and a configuration manager. The system can by readily and flexibly configured, responsive to operator directions, to process metered information to meet the needs of data consumers, such as NSPs and ISPs. Each processing module performs a specific sub-part of a computation on the metered information, and the configuration manager generates a configuration file for specifying the order of operation, computation sub-part, and other operational parameters for the individual processing modules.

The processing modules, referred to herein also as "plug-ins", can operate under the control of an execution management framework. The plug-ins can be viewed as plugging into and out of the framework, and as modular, reusable computational pieces or building blocks, which come together to perform the computation under the direction of the framework and pursuant to a configuration file. The plug-ins can be added, removed, and/or replaced for modifying the calculation performed by the system in generating output data. For use, a user or operator devices the computation, e.g., calculation formula, required for a particular VAS, and uses the configuration manager's user interface to select and order the plug-ins to carry out that formula.

More specifically, the system can have a mechanism for converting the metered information into session data, a processing unit for processing the session data, and a configuration manager. The processing unit performs calculations on the session data to generate processed session data, and includes an execution management framework, and a plurality of plug-ins for processing the session data as directed by the framework with each performing a sub-part of the calculations. The configuration manager generates a configuration file reflecting user selections of configuration parameters for plug-in execution. The configuration manager can include a user interface for receiving the selections, including, e.g., an order of operation and the calculation function or sub-part for each plug-in in accordance with data consumer requirements. The session data can include property name/value pairs pertaining to a session, and the plug-ins can perform operations, including mathematical operations, on the property name/value pairs to obtain a set of processed session data.

The system can be implemented to include a multi-stage processing pipeline, each pipeline stage including multiple processing modules and an execution management framework, and capable of multi-threading operation to cause the plug-ins to execute in series or in parallel to speed processing by the plug-ins while accommodating computational dependencies. In some embodiments, the system can also have a metering apparatus for collecting the metered user information, and a presentation manager for providing processed session data to data consumers.

Accordingly, a system in accordance with the invention can provide a scalable infrastructure to meter, rate, provision, account for, authorize, authenticate, mediate, and bill for services, such as usage-based services. NSPs and ISPs can advantageously employ the system to meter detailed usage information and assign charges for value added services. They can also use the system for processing other metered information regarding the services and their use, such as, for example, information for authentication of users, for prepayment or for credit pre-authorization for service charges. The system permits NSPs and ISPs to create new rating schemes and cross-service plans by entering the appropriate computational parameters using the configuration manager's user interface, e.g., a graphical user interface (GUI).

BRIEF DESCRIPTION OF THE DRAWINGS

The above and further advantages of the invention may be better understood by referring to the following description in conjunction with the accompanying drawings in which.

DETAILED DESCRIPTION

A) Terminology

It may be useful to start the description of illustrative embodiments of the invention by introducing certain terminology. A network entity is a device that is connected to a network. A session (also known as a transaction) represents the use of a service by a client as a collection of properties (defined below). An application server is an entity that provides application services to clients, and is typically a client of a session server. An application service is a task that is performed by an application for a client. The task performed may be, for example, fax/voice calls, video streaming, web hosting, data storing. "Properties" describes the quantities that may be metered for a particular service. A property is represented by a name/value pair, where the name is a unique, human-readable identifier understood within the context of a service. Examples of property names include "bytes-sent" and "duration". A property thus would be represented, e.g., by the pair "bytes sent=1024" or "duration=120".

B) Metered Information Processing System Architecture

Figure 1A:
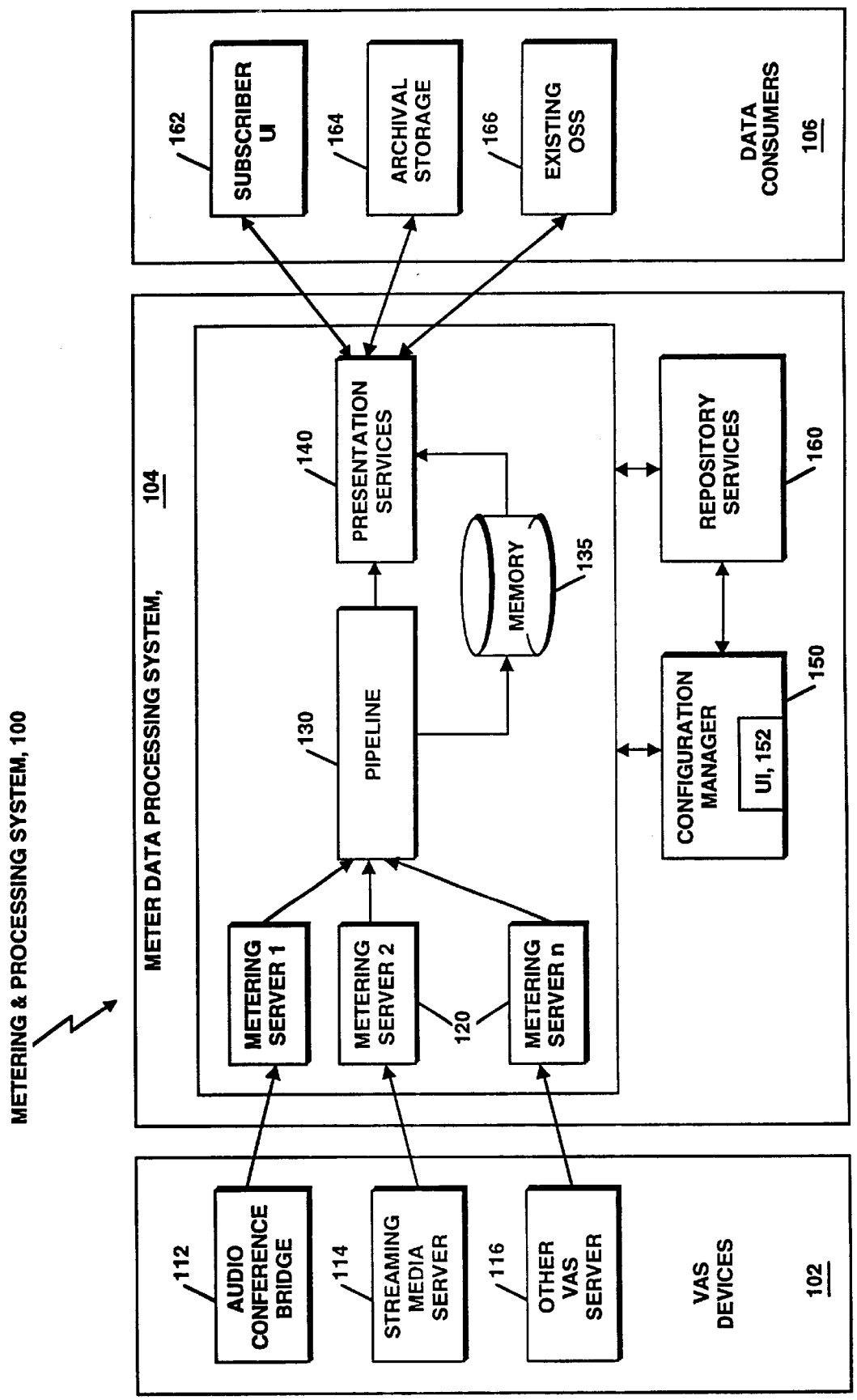
FIG. 1A is a blockdiagram of a metering and processing system in accordance with an embodiment of the invention.

FIG. 1A shows an illustrative architecture for metering and processing system 100 that provides a scalable infrastructure to meter, rate, prevision, account for, authenticate, authorize, and bill for services, such as usage-based services. The metering and processing system 100 includes a number of value added service (VAS) devices 102 for metering communications services and thereby generating metered data in a prescribed form; a metered data processing system 104 for processing the metered data to generate useful information regarding communication services usage; and a number of data consumers 106 (including, for example, NSPs and ISPs), who require the usage data. Essentially, the usage data calculated from the metered data can include product determinations, tariff determinations, rating, and taxation, as required by the data consumers for a variety of purposes such as display, reporting or billing.

The VAS devices 102 include, for example, an audio conference bridge 116 for metering audio conferencing services usage, a streaming media server 114 for metering streaming media services usage, and other VAS servers 116, such as telephone services servers for metering telephone service usage. The metered data regarding the use of a particular VAS by a particular user constitutes what is referred as a "session", and the particulars of the session are described in terms of a set of properties that have values. Each session thus contains at least one name/value pair, i.e., a name identifying a particular property and a value setting forth a quantification of that property. For example, a time stamp property can have a certain date and time value, e.g., "Dec. 31, 1999, 23:59". The VAS devices 102 are responsible for defining sessions, generating the session objects, adding properties and sub-sessions to the session objects, and, when VAS devices 102 completes processing of the individual sessions, storing the session objects and transmitting them (preferably in serialized form) to the processing system 104. For purposes hereof, the sessions are represented as session objects, for example, in extensible Markup Language ("XML") format. The concept of "objects" are well known to those familiar with object oriented programming.

XML is a standard, data structuring and formatting language intended, e.g., for use in IP network (e.g., Internet) applications. XML is compatible with and complementary to, Hypertext Markup Language (HTML), at least in its current version. It is a standard way of describing a class of data objects as stored in computer systems, called XML documents, and behavior of programs that process these objects. XML documents are made up of storage units called entities, which contain either text or binary data. Text is made up of characters, some of which form the character content of the documents, and some of which form markup. Markup encodes a description of the document, such as its storage layout and logical structure. An XML document includes a hierarchical set of markup elements, where most elements have a start tag, followed by content, followed by an end tag. Tags are enclosed in angle brackets ("<" and ">") and indicate structure labels for markup elements, such as, for example, titles, identifiers, dates, lists, and links to other data. Depending on context, XML also refers to an in-memory object structure, which is compliant with the XML standard's semantics. A software module called an XML processor and executable on a computer system, is used to read XML documents and provide access to their content and structure. Many XML concepts are used herein, such as "documents", "elements", "tags", "attributes", "values", "content", "entities", "links", and "pointers". Further information regarding XML can be had with reference to Version 1.0 of the XML specification, available at <HTTP/www.w3.org/pub> on the Internet, and incorporated herein by reference.

The processing system 104 can include a plurality of metering servers 120, a transaction processor pipeline 130, a memory 135, a presentation manager 140, and a configuration manager 150. The metering servers 120, numbered 1 through n, are each associated with a different one of the VAS devices 102 for performing the following functions: receiving metered information in the form of session objects from the associated VAS device, persistently storing the session objects, and passing the session objects to the pipeline 130.

The pipeline 130 processes the metered session through a sequence of steps or stages that transform the metered data contents of the session objects into the processed usage data, which are stored in memory 135. The processed usage data can include a subset of the metered properties of the metered data along with additional properties that are synthesized from the metered properties. The pipeline 130 can aggregate metered data from related or unrelated transactions. The aggregated data can then be incorporated in reports or in calculations based on aggregate usage of a product, such as, for example, monthly service plans. A special case of data aggregation is collecting data from child sessions and reporting the aggregated data in a parent session.

The presentation manager 140 receives the processed usage data directly from the pipeline 130 or via the memory 135 and provides the processed usage data to the data consumers 110, preferably in a format specified by the individual subscribers. For example, the presentation manager 140 can serve as a reporting interface for enabling data consumers to view the usage data, e.g., service charges, in real-time. In an illustrated implementation, data consumers can use an Internet browser such as Microsoft Internet Explorer™ or Netscape Navigator™ to access a logon page for the presentation server and, after logon, view displays of metered usage for the particular account.

The communication metering system 100 also has a configuration manager 150 responsible for configuring the metering servers 120, pipeline 130 and presentation manager 140; and a repository services manager 160 responsible for managing storage of sets of configuration information.

Data consumers 106 can include service information subscribers, e.g., NSPs and ISPs. Each of the data consumers 106 can use a user interface (UI) 162 to view the service information on request, store the service information in archival storage 164 for later use, or use the information, e.g., in a system 166 for billing, provisioning and providing customer support ("Operation System Support" or "OSS").

Figure 1B:
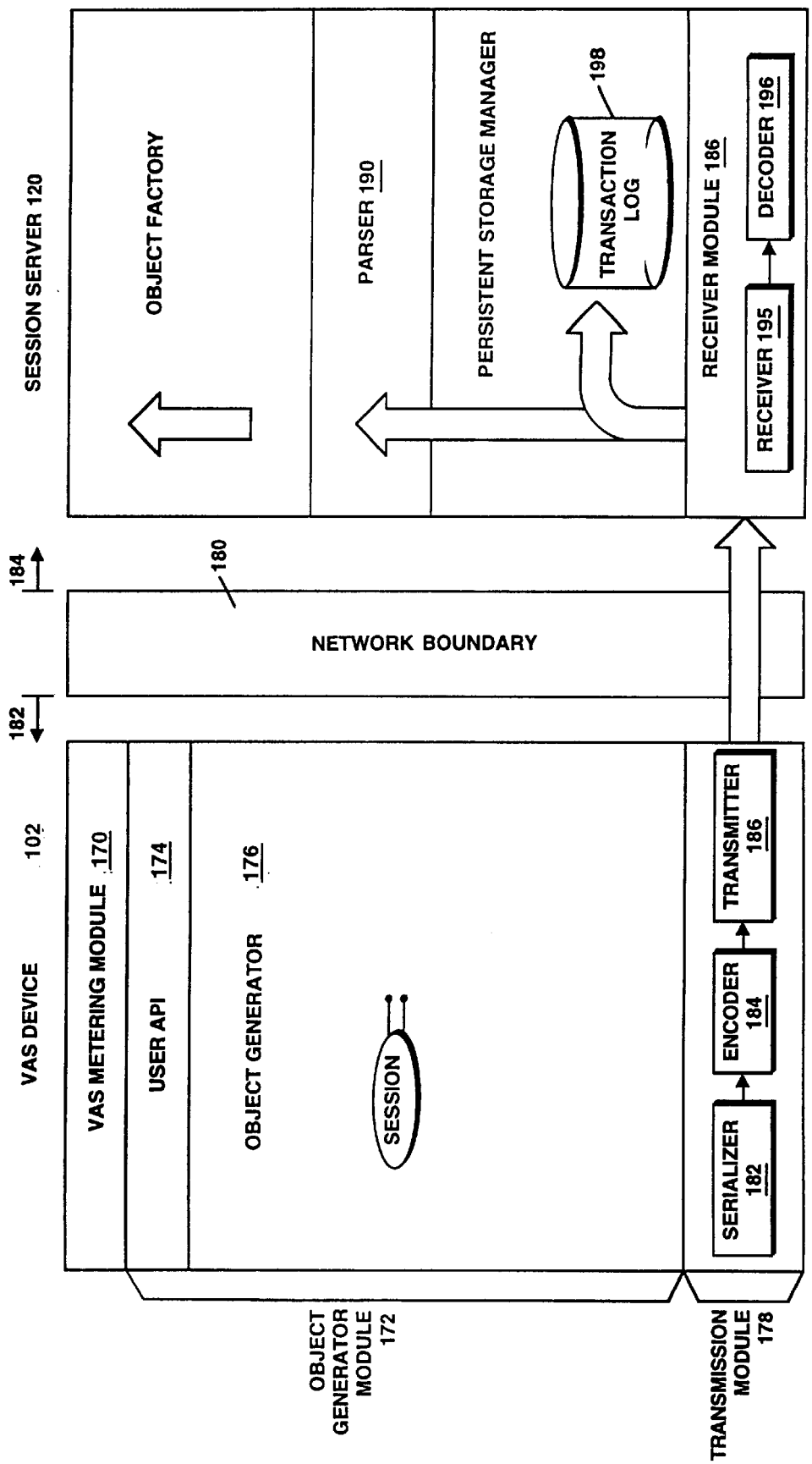
FIG. 1B is a block diagram illustrating an exemplary technique for generating metered information objects for processing in the pipeline of FIG. 1A.

FIG. 1B illustrates the operation of an exemplary one of the VAS devices 102 and the associated metering server 120 with respect to the generating of session objects. The VAS device 120 has a metering module ("meter") 170 for metering a particular VAS and thereby collecting usage data, and an object generation module 172 for generating objects from the usage data and providing the objects to the session server 120. The meter 170 can be of conventional design, and specific to a particular VAS. The object generation module 172 has a user interface 174, an object generator 176, and a transmission module 178, which can be, for example, all bundled as part of a software development kit (SDK) for use by metering application programmers. Additionally, the SDK can provide a standards-based mechanism for communication between the VAS devices and the metering servers.

The user interface 174 can include, e.g., an application programming interface (API) for interfacing with, and therefore reformatting data as required from, the metering module 172. The object generator 176 generates session objects containing properties having values representing the usage data. The transmission module 178 can include a serializer 182, an encoder 184, and a transmitter 186. The serializer 182 serializes the objects to be transmitted into an object stream. The encoder 184 encodes the object stream, for example, for error detection purposes and/or authentication purposes. The transmitter 186 transmits the encoded object stream, e.g., embedded in a carrier wave, to the session server 120. The transmission may pass across a network boundary 180 separating a first network 182 containing the VAS device 102 from a second network 184 containing the session server 120.

The session server 120 includes a receiver module 186, a persistent storage manager 188, a parser 190, an object factory 192, and a distribution module 194. The receiver module 186 includes a receiver 195 for receiving the encoded object stream, and a decoder 196 for decoding the encoded object steam back into an object stream. The persistent storage manager 188 is responsible for storing the object stream into a transaction log 198, which records the object steam in a suitable database. The parser 190 parses the object stream into discrete objects to extract the data content, including, for example, account and session identification information, and name/value pairs contained therein.

A communication transaction can have a variety of information captured in the data content. For example, the data content can include a server host name (the name of a metering server); a server user name (a name to use when sending sessions to the metering server); the server password (a password to use when sending sessions to the metering server); account ID (an account to which the session will be metered); a transaction description (a description of the transaction); amount (a monetary amount assigned to the transaction); and a unit of measure (a currency of the amount), among other content.

For example, a communication transaction can have a time stamp of 4AM, account identification information (e.g., version number, uid, and entity), session identification information (e.g., commit, account identifier, and parent identifier), and, e.g., two properties having name/value pairs of duration/777 and nameperson/David. In that case, the following object stream, expressed in XML format, could result:

```
<session>
    <timestamp>4:00AM</timestamp>
    <version>1.0</version>
    <uid>x6s09uAkgKgCaDZDF29+w</uid>
    <entity>dsmith.abc.com</entity>
    <beginsession>
        <dn>abc.com/x</dn>
        <commit>y</commit>
        <accountid>x6s0956789</accountid>
        <parentid>abc</parentid>
        <properties>
            <property>
                <dn>duration</dn>
                <value>777</value>
            </property>
            <property>
                <dn>nameperson</dn>
                <value>david</value>
            </property>
        </properties>
    </beginsession>
</session>
```

The parser 190 would parse this object stream and extract the time stamp of 4AM, the version number, Uid, entity, the commit, account identifier, parent identifier, and the name/value pairs of duration/777 and nameperson/David.

The object factory 192 converts the object contents extracted by the parser into factory session objects, e.g., reconstitutes the session objects from the object content of the stream. These session objects can include not only the same objects as generated by the object generator 176 and described above, but also other objects formed for particular processing requirements. Such "other" pipeline objects can include aggregate objects, in which the contents of different session objects are aggregated, such as, for example, duration time aggregated from different session from the same entity.

The distribution module 194 forwards the session objects, under the control of the configuration manager 150, to the pipeline 130 for processing. The session objects processed in the pipeline 130 will be sometimes referred to as simply "session objects".

C) The Transaction Processor Pipeline

Figure 2:
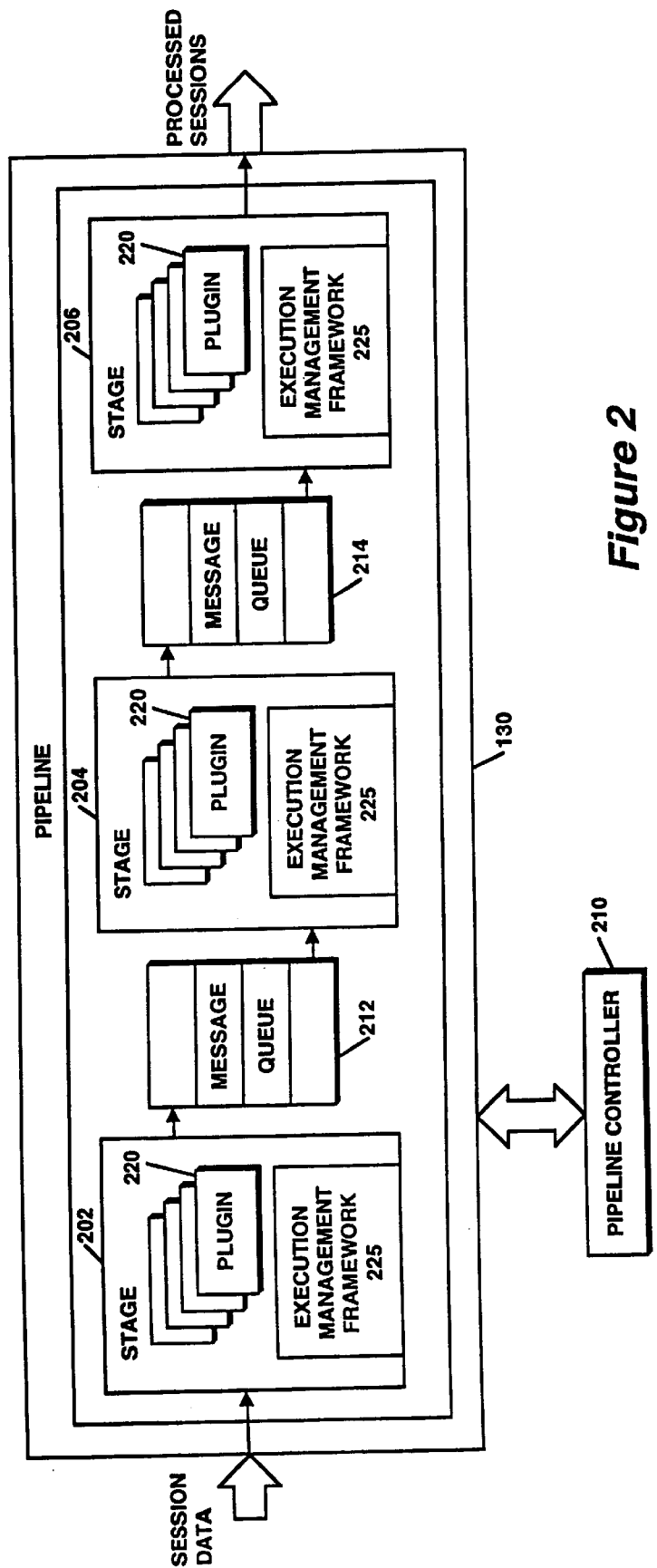
FIG. 2 is a block diagram providing an overview of the pipeline of FIG. 1A.

FIG. 2 shows an illustrative embodiment of the transaction processor pipeline 130, which processes session data, preferably in session object form containing property name/value pairs, to produce processed session or usage data. The pipeline 130 passes the processed usage data to the presentation services manager 140 of FIG. 1 for presentation to data consumers 106.

Figure 3:
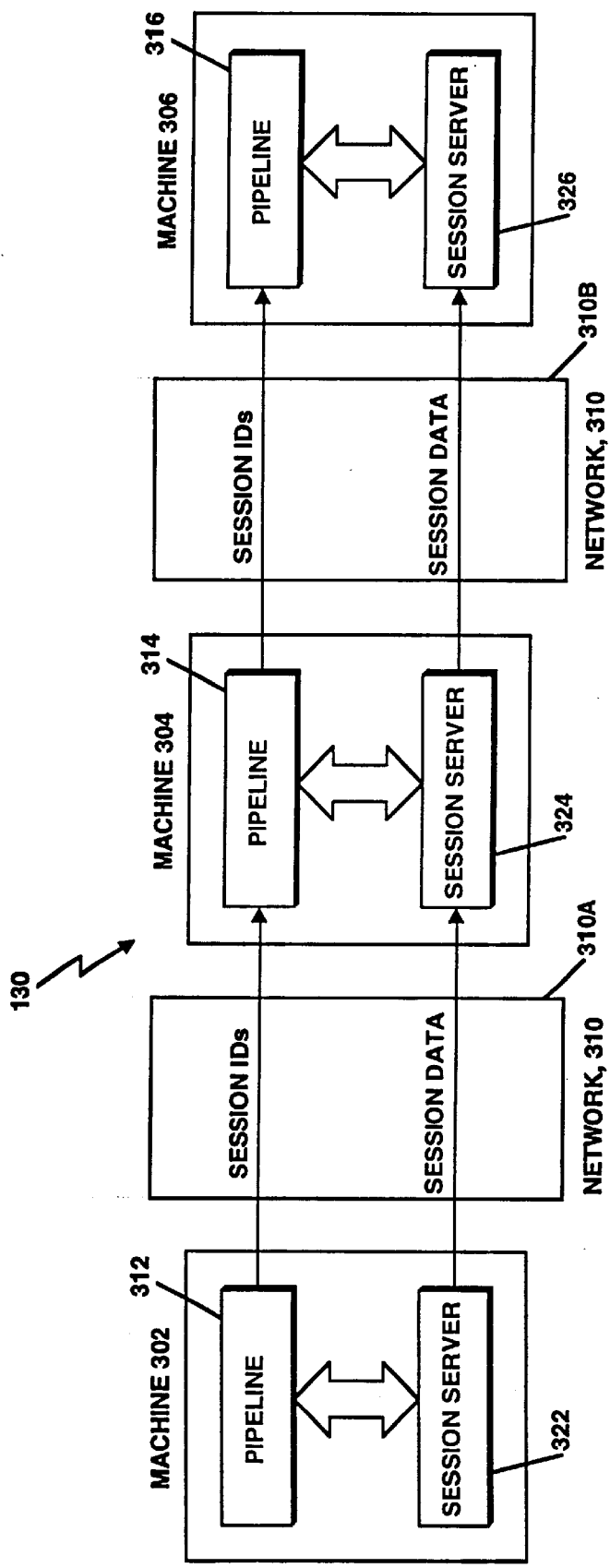
FIG. 3 is a block diagram showing the pipeline of FIG. 1A as implemented on multiple computer systems.

The pipeline 130 is made up of a number of pipeline stages 202, 204, 206 under the control of a pipeline controller 210. The pipeline stages can be implemented within a single computer system ("machine"), but preferably are implemented on multiple, coordinated machines, as shown in FIG. 3 for increased speed and flexibility in operation. The exact number of stages and machines used in an implementation, and the number of stages implemented by any single machine, will depend on the application and machine availability; the illustrated implementation merely being exemplary. The pipeline controller 210 can be a computer-executed program stored and executed, for example, on one of the machines 202, 204, 206 or a separate machine (not shown). The stages 202, 204, 206 are chained (i.e., connected) together via message queues 212, 214 connected in the data stream between the adjacent stages for passing session objects therebetween, including partially or wholly processed objects. The queues 212, 214 enable non-synchronous operation of the stages. Each of the stages 202, 204, 206 coordinates the execution of a number of processing modules ("plug-ins") 220, supported by an execution management framework 225. The plug-ins 220 can be viewed as plugging into and out of the execution management framework 225, depending on computational requirements.

Plug-ins 220 are modular, computer-executable objects each containing a process for performing a single function, e.g., a specific portion of a calculation on the value portion of a property name/value pair. The remaining portions of the calculations are performed by other plug-ins 220. The process contained in a plug-in includes a sequence of executable computer instructions organized in one or more callable procedures or routines. Plug-ins 220 preferably have a system services interface for accessing system services provided via the framework 225, e.g., to allow the plug-ins 220 to read configuration data. The order of execution of plug-ins 220 can be determined by a dependency graph or its equivalence, as described below, and established by the pipeline controller 210.

FIG. 3 shows a per-machine view of the transaction processor pipeline 130, as implemented in three pipeline machines 302, 304, 306. The machines 302, 304, 306 are interconnected, for example, by a network 310, which is shown for convenience at both 310A, 310B. Each machine 302, 304, 306 contains a pipeline component 312, 314, 316 and a session server 322, 324, 326, respectively. The pipeline stages 202, 204, 206 shown in FIG. 2 are each implemented by a respective one of the pipeline components 312, 314, 316, each capable of executing one or more of the plug-ins on session data (e.g., session objects). Each pipeline component 312, 314, 316 passes session identifiers (SIDs) via the network 320 to the machine 302, 304, 306 that executes the successive pipeline stage (i.e., the next machine 302, 304, 306) for identifying the session. The associated session server 322, 324, 326 passes session objects via the network 320 to the session server 322, 324, 326 of the successive pipeline stage 202, 204, 206 (i.e., to the next machine 302, 304, 306) to enable processing to be continued in that successive stage.

A session server 440 is responsible for receiving session data, e.g., session objects, from a prior session server. In addition, the session server 440 is responsible for maintaining session storage 420.

Figure 4:
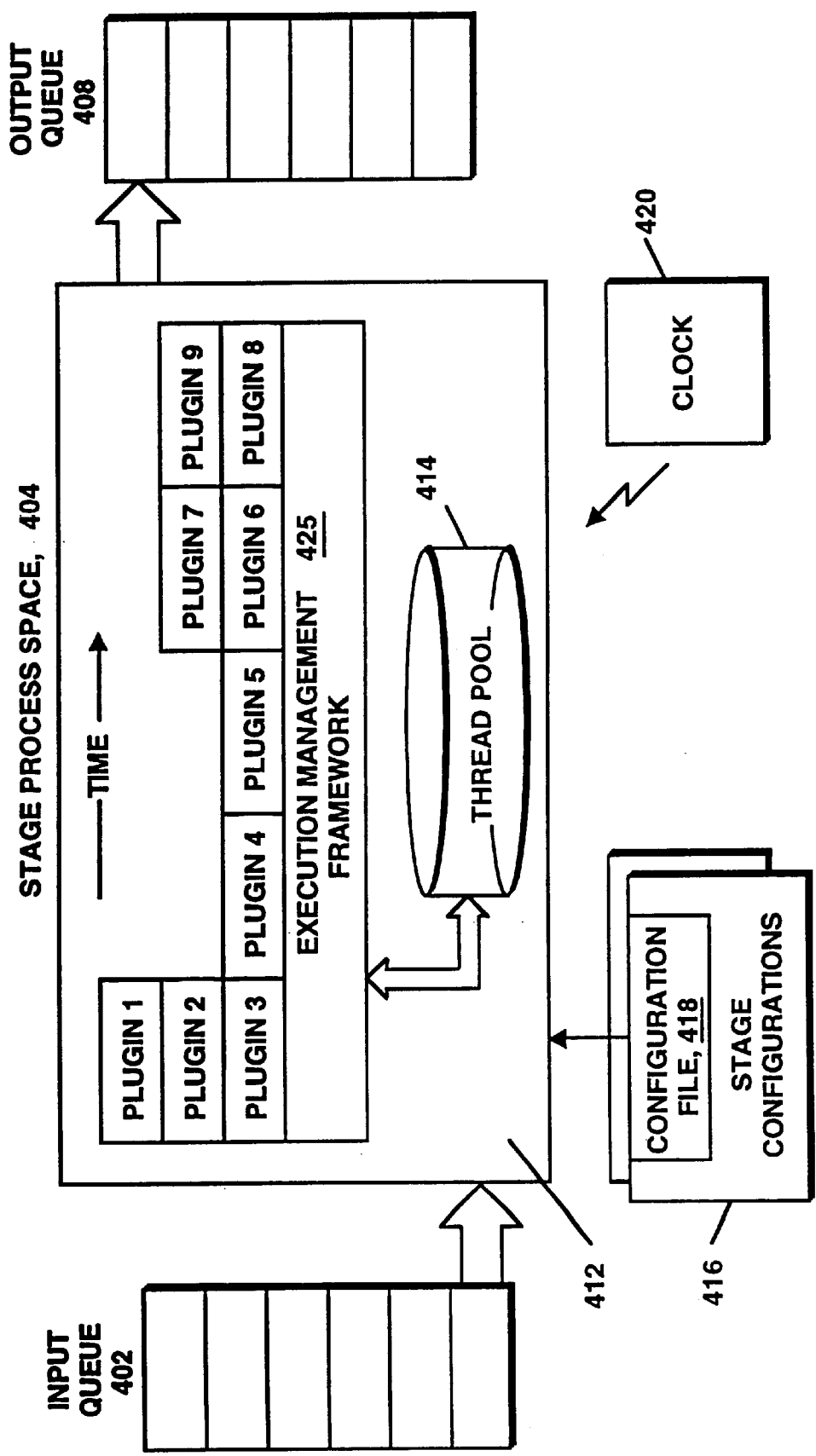
FIG. 4 is a block diagram depicting the architecture of a stage of the pipeline of FIG. 1A.

FIG. 4 shows an architectural view of a pipeline stage 400. The stage 400 includes an input queue 402 (e.g., a FIFO buffer), a multithreading process space 404, and an output queue 408 (e.g., a FIFO buffer). The process space 404 processes a number of plug-ins, numbered 1 through 8, under the control of an execution management framework 412, and pursuant to processing threads stored in a thread pool 414. A stage configuration module 416 receives configuration files 418 from the configuration manager 150, which define stage operations as well as operation of the plug-ins nos. 1–8 of the corresponding process space 404 and their processing inter-dependencies. The stage configuration module passes the plug-in configuration information to an execution management framework 425. The execution management framework 425 uses this information to determine which of the plug-ins nos. 1–8 can be processed in parallel (and during the same clock cycles per clock 420) and which of the plug-ins nos. 1–8 need to be processed in sequence after other plug-ins because they depend on a final or intermediary result from the other plug-ins. As illustrated, those of the plug-ins nos. 1–8 that can be processed in parallel are shown in a vertical stack in the drawing (as in the case, e.g., of plug-ins 1, 2 and 3; or plug-ins 6 and 7; or plug-ins 8 and 9). Moreover, those of the plug-ins nos. 1–8 that are dependent on, and therefore need to be processed after, other plug-ins are shown to the right of the other plug-ins on which they depend (as in the case, e.g., of plug-in 5 dependent on plug-in 4 and thus shown in the drawing, to the right of plug-in 4).

Accordingly, in summary, the illustrated embodiment of the pipeline 130 provides a flexible, distributed system for performing calculations defined and performed by plug-ins executed in a prescribed order, per data consumer requirements, on property name/value pairs of session objects to obtain a set of processed session data for data consumers. Plug-ins are modular, computer-executable computer programs that specify a specific computational function or operation with respect to session objects. The level of granularity of the computational functions should be low enough to make it likely that the plug-ins can be reused for processing usage data for other VAS. The modular nature of plug-ins permits them to be readily inserted into the pipeline at any stage, executed in any order, and added, removed, or replaced for modifying the calculation to produce a different set of processed session data. The pipeline can process any number of plug-ins in any desired order.

The configuration manager 150 (FIG. 1A) manages the configuration of the metered data processing system 104 (FIG. 1A) in scheduling execution of the plug-ins. The configuration manager 150 provides configuration files to the pipeline controller 210 (FIG. 2) for controlling pipeline operation in plug-in execution. The configuration files includes stage configuration files 418 (FIG. 4) for defining plug-ins and their inter-dependencies. Each machine 302, 304, 306 (FIG. 3) of the pipeline can form one or more pipeline stages 202, 204, 206 (FIG. 2). Each pipeline stage 202, 204, 206 (FIG. 2) processes a single session, forms a single process space, and can process one or more plug-ins.

D) Configuration Parameters

The metered data processing system 100 (FIG. 1) is configurable for processing sessions pertaining to particular VASs, and thereby obtaining usage data specific to the VASs. For processing a session, an operator uses an user interface (UI) 152 (FIG. 1A) of the configuration manager 150 (FIG. 1A) to configure the pipeline 130. The configuration manager 150 generates a configuration file for each stage of the pipeline 518, preferably specifying configuration data in XML format. The configuration file is sent to each stage configuration module 416 (FIG. 4) for configuring the respective stage. The configuration file is also sent to the execution management framework 125 of each stage to configure the plug-ins. The configuration files can be distributed, e.g., by a configuration web server included in the configuration manager for distribution via HTTP to pipeline servers.

The configuration files configure the stages and plug-ins at three-levels. To configure a pipeline, an operator first selects and loads a stage layout, then selects and loads a layout of the plug-ins within each stage, and then selects and loads individual plug-in parameters, all as will described next.

A first or top level configuration entails configuring the layout of the pipeline stages. This configuration includes the following configurable parameters: stages on each machine, and arrangement and dependencies between stages. The pipeline preferably can run multiple configurations, and, can dynamically switch back and forth between versions. Thus, for example, where a prior VAS is being replaced with a new VAS version, the pipeline can be configured to process session data, e.g., in alternation, from the old VAS and the new VAS during a transition period in which not all customers have been switched to the new plan. The time stamp of the session determines which configuration is selected—e.g., prior to a certain date, a first configuration is used, and after that date, the latter configuration is used.

The next level of configuration is the layout of the plug-ins within each stage. This configuration includes the following configurable parameters: dependencies between plug-ins; and properties read, created, and/or modified by each stage. This plug-in layout configuration establishes how plug-ins are going to be arranged in the pipeline, and the dependencies between the plug-ins.

The final level of configuration in this embodiment is each instance of plug-in, which is configurable as to all aspects of its purpose. This configuration includes the following configurable parameters: plug-in identifier; and configurable parameters specific to the plug-in. The behavior of each plug-in changes depending on the parameters with which it is configured. Preferably, each plug-in has a custom user interface for receiving operator-specified values for the parameters that control the behavior of the plug-in.

The configuration manager 150 preferably stores the configuration files in persistent memory, and, pursuant to operator instructions, can cause the execution management frameworks 225 to load any of the previously stored configuration files for use in processing a session.

E) Plug-ins and Sessions

Plug-ins operate on sessions, which are made up of a set of property name/value pairs. Each individual plug-in perform a sub-part of the computation on the property values performed by the pipeline in its entirety. The sessions have service-specific properties that were sent to the pipeline from the VAS devices, as well as properties generated by the pipeline during processing (such as a service name of the session). Plug-ins that operate on service-specific properties are called "service plug-ins", and those that operate on properties regarding processing system operation, e.g., logon, are called "system plug-ins". As sessions are passed between pipeline stages, plug-ins may create new properties for the use by other plug-ins, for display to the user, or for use by an external system. Properties that are created for use by other plug-ins and later discarded are termed "ephemeral properties". After a session has worked its way to the end of the pipeline, it is left with properties containing the results of the computational pieces performed by the plug-ins. These results can be either displayed to the user, stored, or used by an external system.

Session sets are groups of related or unrelated sessions. The pipeline can operate on sessions in batches instead of one by one. Other operations, such as aggregation, require plug-ins to create aggregated data from a set of sessions. Session sets provide the abstraction to work with sessions in batches. Different session sets have different longevity.

Some sets remain in use, e.g., for months at a time, while others are used only briefly before being discarded. For this reason, session sets must have the ability to remain temporarily or persistently in memory.

Session sets allow certain set operations, such as union and subset. Sets also allow simple types of aggregation, such as summing each value of a certain property from every session within the set. A plug-in could iterate through each item in a set, summing values or filtering the set appropriately.

There are several other types of plug-ins that will be described separately. A "simple plug-in" operates on a single session at a time. In processing the session, a simple plug-in may examine existing properties and may create new properties. When a simple plug-in completes its operation and passes control back to the framework, the session is passed on to the next plug-in in the pipeline. A simple plug-in is really just a session set plug-in that operates on a set with a single session.

"Set plug-ins" operate on a set of sessions as a batch. The set plug-ins can examine any of the properties of any of the sessions within the set. They may also create new properties for any of the sets. After the set plug-in completes its operation, the session set is passed to the next plug-in in the pipeline. A basic way to operate on a session set is to iterate through each session in the set, working on the sessions one by one. If the results of one computation can be applied to more than one session, it may be beneficial to sort the set first, then work on the set in small groups. For example, a plug-in that matches a username to an account number stored in memory may sort the set by username, look up the account number for a user name, then set the account number property for each session in the set that had the user name. Since the set has been sorted by username, all sessions with the same username will appear right next to each other. Set plug-ins can remove sessions from the set on which they are operating. If a session is removed from a set, no further processing is performed on that session. This allows the set plug-in to act as a filter, i.e., capable of discarding sessions. Sessions in the set may or may not have any relationship to each other. The purpose of a set plug-in is not to aggregate the data from the set. A plug-in can call another plug-in, e.g., an aggregation plug-in, described below, to perform a computation for which it is designed.

The pipeline is not simply a long series of plug-ins that execute one by one in a predetermined order in sequence or in parallel. The plug-ins can make decisions on where the session should move next. A "fork plug-in" allows a session to begin moving down a new piece of the pipeline. One fork plug-in splits the pipeline based on service ID. When sessions first come in the pipeline, they go through default processing and then to service plug-ins that collectively "know" how to rate each type of service (i.e., they perform the rating calculations for the service). At this decision point, a fork plug-in looks at the service ID of the session and routes the session to the correct service-specific sequence of plug-ins. After the service plug-ins have completed their work, the sessions are forked back into post-processing before the pipeline completes. Complicated rating systems will require this type of decision making within the pipeline. Fork plug-ins are allowed to fork the pipeline based on any set of criteria.

"Aggregation plug-ins" combine data from a set of sessions and store that data in a session. After the data is aggregated once, the pipeline can use the stored data instead of having to recalculate the aggregate. An example of aggregating sessions is rating a fax broadcast service that sends the same fax to a number of recipients. If the cost of the fax broadcast parent session were to be set to the sum of the costs of its individual faxes, the combination of a set creation plug-in and an aggregation plug-in could be used. First, the set plug-in would add each individual fax session to a set. Then, when the parent broadcast session came through the pipeline, an aggregation plug-in would calculate the sum of the set of fax sessions and store that sum in the parent fax broadcast session. The parent session could then be further rated without having to examine the individual fax sessions again.

Aggregation plug-ins can also be used to aggregate unrelated sessions. If a company wants to see the total number of faxes it sent over a month to a certain fax machine, an operator could set up a set creation plug-in to add each fax session to that number (whether they were part of a broadcast or not) to a set. At the end of the month, a session generator could create a session to hold the total number of calls to that fax machine. An aggregation plug-in would then count the total number of faxes in the set and store that number in the newly created session. Aggregation plug-ins can preferably set any number of properties in the aggregate session, although they preferably may not modify any session in the set. Session sets have operations specifically designed to perform this type of aggregation. If possible, these operations should be used rather than iterating through each session within the set. The session set is preferably optimized to perform this type of task. After an aggregation plug-in completes its task, the aggregate session moves on through the rest of the pipeline. The session set that was operated on remains unchanged.

F) Stage and Plug-in Configuration and Operation

Figure 5:
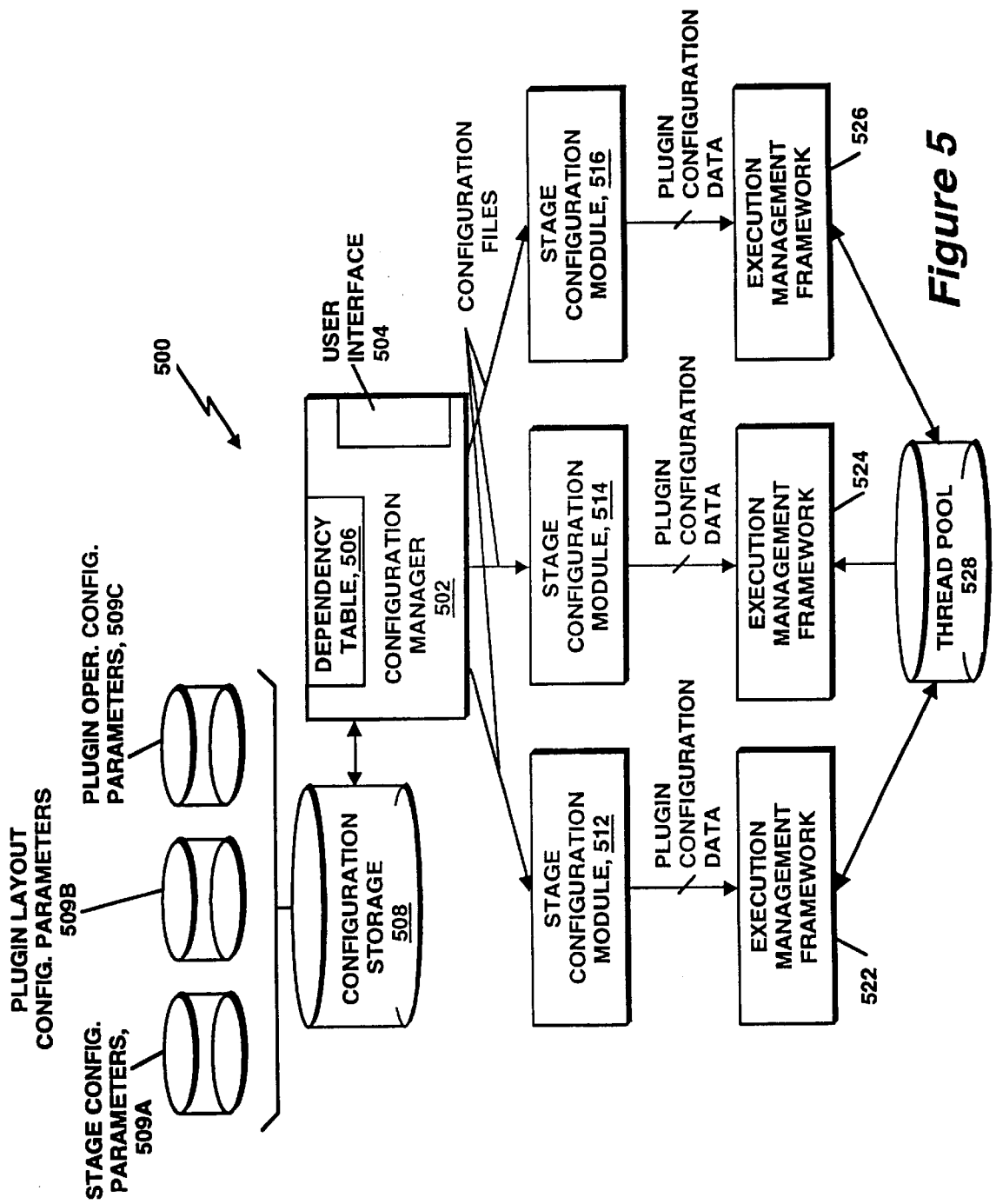
FIG. 5 is a block f a portion of FIG. 1A involved in plug-in configuration and operation.

FIG. 5 shows a portion 500 of the metered data processing system 104 responsible for directing stage and plug-in configuration and operation, while taking into account computational dependencies. As illustrated, a configuration manager 502 has a user interface 504 for receiving operator-specified configuration parameters regarding pipeline stages and plug-ins. The configuration manager 502 also includes a table or directory 506 for holding dependency data. The configuration manager 502 generates configuration files for the sessions by enabling a user to select, from a configuration storage memory 508, configuration data using the user interface 504. The configuration storage memory 508 can include stage configuration parameter storage 509A, plug-in layout parameter configuration storage 509B, and plug-in operation parameter storage 509C. Examples of the individual parameters are given above. The plug-in operation parameters include selections of the types of the plug-ins as just described above, and their specific functions. The functions can include, for example, performing a mathematical operation like adding, subtracting, dividing, multiplying, or averaging, to name a few. The functions can also relate to processing flow, as performed, for example, by fork plug-ins, or session manipulation, as performed, for example, by session generator plug-ins.

This process of configuring the stages and plug-ins can be menu driven, with the user selecting from predetermined and preloaded configuration parameters. The plug-ins preferable are pre-existing, reusable computational building blocks that the user selects and orders in a desired combination and sequence to yield a desired computation, such as a calculation formula. The user can devise the formula, or can select from preloaded formulas provided by the configuration storage 508. The configuration manager 502 then stores the selections, and generates a configuration file reflecting the selections and pipeline operational characteristics to effectuate the desired computation, which is also stored, preferably persistently, in the configuration storage 508.

For processing a session, the configuration manager 502 provides a configuration file to each stage configuration module 512, 514, 516 for configuring each respective one of the stages of the pipeline. The stage configuration modules 512, 514, 516 pass plug-in configuration data to the execution management frameworks 522, 524, 526 responsible for directing operation of plug-ins within the respective stages. Each execution management framework 522, 524, 526 is preferably associated with a different one of the stages, and is implemented as a computer-executable program that runs on an associated machine of the pipeline. The execution management frameworks 522, 524, 526 access the thread pool 528 and serve as thread schedulers to assure proper execution of the plug-ins in the correct order. As a session is to be processed within the stage, the execution management framework 522, 524, 526 receives control of the session objects, calls plug-ins for performing sub-parts of computations on the session objects, and then receives control again of the session objects after each plug-in completes its operations.

The execution management frameworks 522, 524, 526 collectively constitute an infrastructure that allows any type or number of plug-ins to be arranged and operated in any order pursuant to a configuration file associated with each session. The infrastructure allows plug-ins to be distributed across multiple machines and takes care of the communication across processes and across machines. Some plug-ins have dependencies on certain properties being available at the time they operate on a session. They, in turn, can supply properties on which other plug-ins may depend. The infrastructure ensures that all required properties are available at the time the plug-in runs. Sometimes it does not matter which one of a group of plug-ins is called at a certain time because none of them have cross-dependencies on any of the others in the group, and then the plug-ins of the group can be run in any order.

The pipeline operator can combine plug-ins into large chunks of functionality, called stages. Each stage is made up of several pipeline plug-ins. The pipeline infrastructure calls each plug-in in a stage in the correct order, managing the dependency and load balancing between the plug-ins. Communication between stages is based on a queuing architecture. Each stage manages a queue of messages, e.g., session objects. The pipeline infrastructure pulls the session objects off the queues when appropriate, and then calls the plug-ins in the right dependency order to process the session objects. After all the plug-ins have been processed in the stage, the infrastructure sends the session objects to the queues of additional stages. Any fork plug-ins redirect sessions to stages different from the ordinary sequence of stages in which the plug-ins would be processed.

G) Plug-in Dependency Graphs and Execution Order

As noted above, plug-ins can be implemented as modular pieces of code that are executed during run-time for performing a defined task, such as a sub-computation on session data. Usually, the plug-ins need to be executed in a certain, specified order to effectuate the desired, overall computation performed by the stage that contains them. A complexity is introduced in specifying that order because plug-ins can be dependent on other plug-ins. Generally speaking, given two plug-ins M and N, if plug-in M computes the value x (as a final or intermediary result) and plug-in N requires the value x to perform its computation, then plug-in N depends on plug-in M. Plug-ins can be dependent on zero, one, two, or more, other plug-ins. In the above notation, because of the noted dependency between M and N, the stage infrastructure will wait for plug-in M to be executed before it starts execution of plug-in N. Plug-ins with zero dependencies can be executed immediately or at any other time, without regard to prior execution of other plug-ins.

Figure 6A:
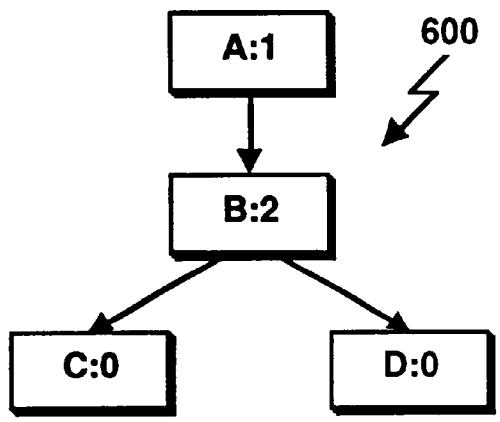
FIG. 6A is a block diagram illustrating an exemplary dependency graph.

FIG. 6A illustrates an exemplary dependency graph 600 for specifying a particular order of execution of plug-ins in an illustrative application. As shown by the arrows, plug-in A depends on plug-in B. Accordingly, plug-in A has one dependency, as represented by "A:1". On the other hand, plug-in B has two dependencies, namely, plug-ins C and D, as represented by "B:2". Neither plug-in C nor plug-in D has any dependency, hence "C:0" and "D:0".

For execution, the dependency between plug-ins is determined either manually or by the configuration manager, and is recorded in the stage configuration file for the particular stage. The dependencies noted in the graph can be sorted and listed in the stage configuration file, as described below. Alternatively, the graph 600 of the plug-ins can be represented, e.g., by a suitable data structure, array or table as part of the configuration file for the particular stage in configuration storage 508 (FIG. 5).

The configuration file holds information associated with each node in the graph 600 as needed to execute the plug-in, including information specifying the number of other plug-ins on which each plug-in depends. The stage uses that information in executing the plug-ins in the correct order. At any given time, it might be possible to execute more than one plug-in: if two plug-ins do not depend on each other, the two plug-ins can be executed in any order, or can be executed simultaneously (i.e., in parallel during the same clock cycle) by multiple threads. Therefore, for instance, if a plug-in will take a long time to execute because it must wait on the results of a database query by another plug-in, the pipeline infrastructure can execute other plug-ins in the mean time. At any time, any plug-in that has zero dependencies can be executed.

Figure 6C:
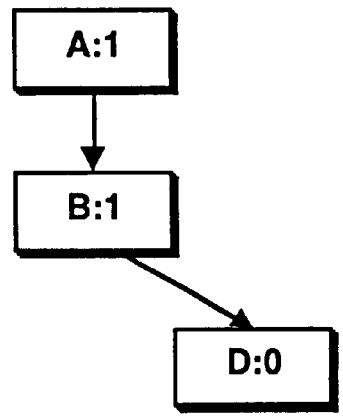
FIG. 6B is a block diagram of a plug-in, showing a dependency tracking mechanism in accordance with an embodiment of the invention.
Figure 6D:
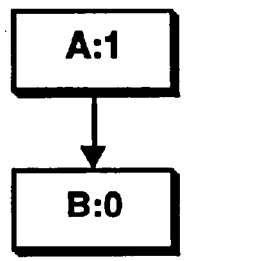
Figure 6E:
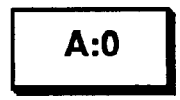
Figure 6B:
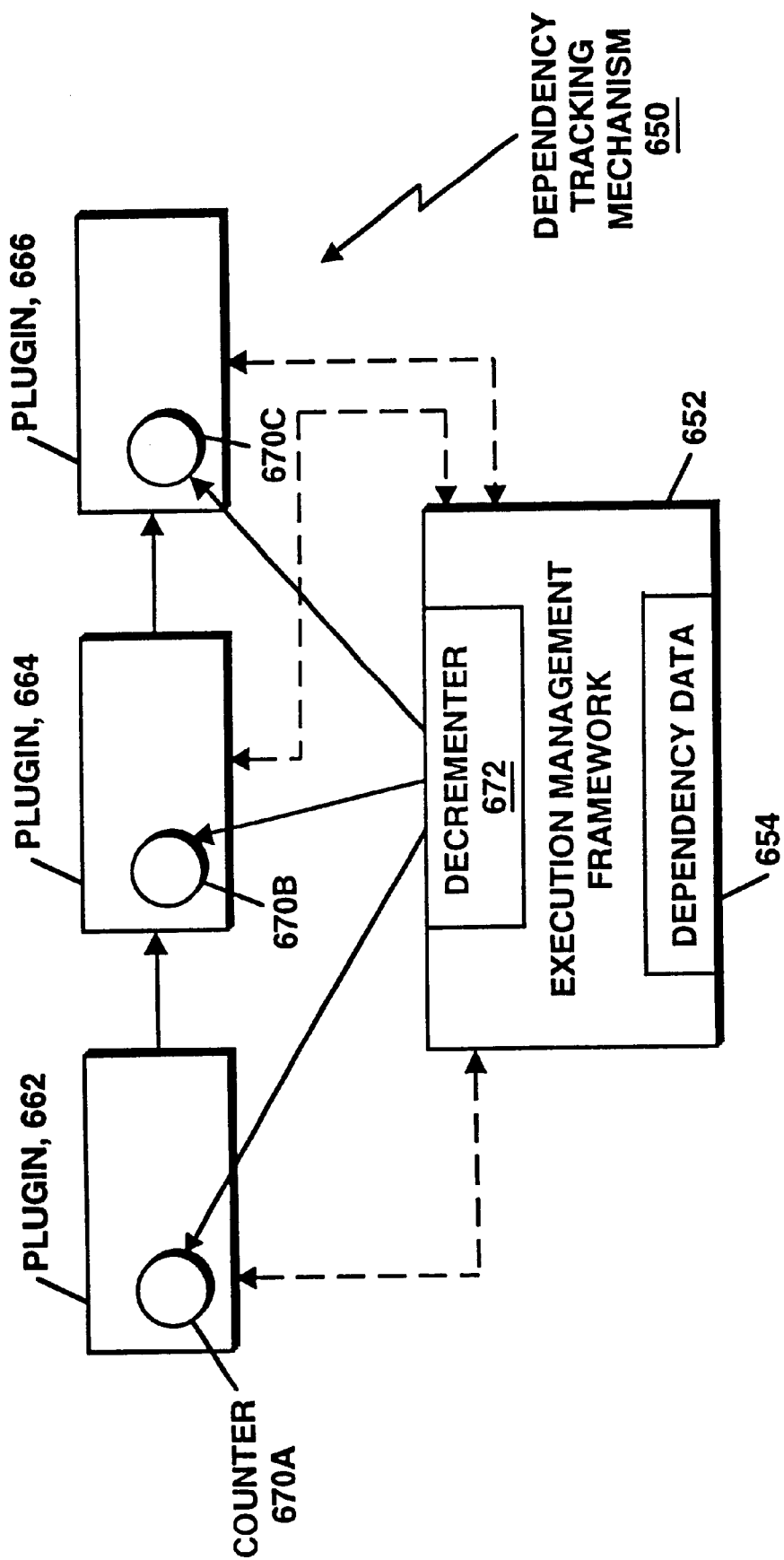

FIG. 6B shows a dependency tracking mechanism 650. Each execution management framework 652 can be preloaded with dependency data 654 from a configuration file provided by the configuration manager 602 (FIG. 6A), which specifies plug-in order and dependencies for processing. A different configuration file including a different set of dependency data is provided for each stage. The execution management framework 652 directs execution of each plug-in 662, 664, 666, in series or parallel with other plug-in(s). Each plug-in 662, 664, or 666 includes a dependency counter 670A–C (or, alternatively, is associated with a counter stored in memory). Prior to execution, the execution management framework 652 causes the counter for each plug-in to be loaded with a count that indicates the number of plug-ins on which it depends. As a plug-in 662, 664, or 666 completes execution, it notifies the execution management framework 652. A count conditioning mechanism, e.g., the illustrated decrementer 672 in the framework 652, causes the counter 670A–C of any plug-ins dependent on the then executed plug-in to be decremented by a single count. This continues iteratively upon each execution until a predetermined threshold is reached, e.g., a count of zero, for a particular plug-in. (Alternatively, an incrementer could be used, and incremented to a predetermined threshold.) When the threshold is reached for the counter 670A–C of a particular plug-in 662, 664, 666, that plug-in can be executed because its dependencies have been resolved.

Returning to the example of FIG. 6A, plug-ins C and D can be executed immediately because they do not depend on other plug-ins, as indicated by the zero in the designations C:0 and D:0. Afterwards, as is the case each time a plug-in is executed, the dependency counts of counters 670A, . . . for all plug-ins that depend on the executed plug-ins are decremented by decrementer 672. Accordingly, as shown in FIG. 6C, when plug-in C is executed, the counter for plug-in B (which depends on plug-in C) will be decremented from a value of 2 to a value of 1. Plug-in B now has only one dependency, plug-in D. As shown in FIG. 6D, when plug-in D is executed, the counter for plug-in B will again be decremented, this time from a value of 1 to a value of zero. Now, plug-in B has no dependencies and can be executed immediately. As shown in FIG. 6E, when plug-in B is executed, the counter for plug-in A is decremented from a value of 1 to a value of zero. As such plug-in A can be executed immediately. Of course, the plug-ins C and D in this example could alternatively be executed in the opposite order or in parallel.

To implement this algorithm efficiently, the configuration manager or execution management framework (depending on the embodiment) can sort plug-ins by their starting dependency count so as to obtain a plug-in execution list. Accordingly, the list contains specifications of all plug-ins with zero dependency, followed by all plug-ins with a single dependency, followed by all plug-ins with two dependencies, and so on. Within each dependency level, for example, all plug-ins with a single dependency, the plug-ins can be listed (and executed) in any order. The sort order of the graph configuration shown in FIG. 6A can be, for example, C:0, D:0, A:1, B:2. All plug-ins that are ready to be executed appear at the beginning of the list, i.e., they have zero dependency. Each time plug-ins are executed, the dependency counts are updated and the plug-ins are re-sorted to reflect their dependency level. This sorting, execution, and resorting process can continue until all plug-ins have been processed. A number of threads can work on executing plug-ins at the same time. Because all plug-ins with zero dependencies appear at the beginning of the list, threads can simply pull the first item off the list to execute it.

Accordingly, the successive sort lists for plug-in execution for the graph 600 may be as follows during the successive steps of execution:

Step 1: C:0, D:0, A:1, B:2, with plug-in C available for execution.

Step 2: D:0, A:1, B:1, with plug-in D next for execution.

Step 3: B:0, A:1, with plug-in B next for execution.

Step 4: A:0, with plug-in A next for execution.

Then, when A is executed, execution of plug-ins in the particular stage is completed.

Figure 6F:
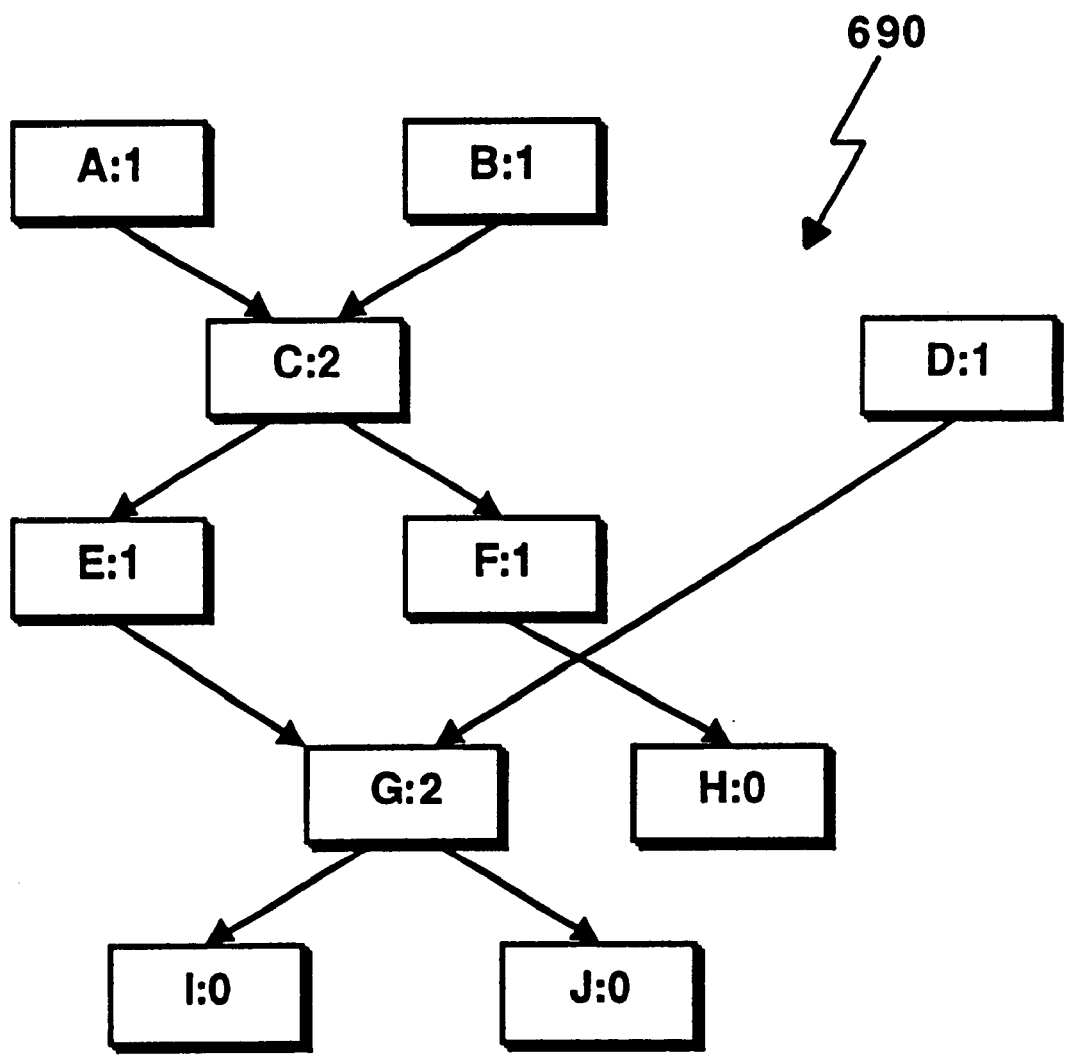

Of course, in practice, more complicated dependency graphs can be encountered. FIG. 6F shows an exemplary graph 690 of such a more complex structure. Node D can be located as shown in the graph 650 at the same level as node C, or can be located alternatively at the same level as E and F, or at the same level as A and B. The graph 690 yields an order of execution by following the same rules as discussed above in conjunction with FIG. 6A–E. Successive sort orders for the nodes of the dependency graph 690 may be, for example, as follows: Initial sort of J:0, I:0, H:0, F:1, E:1, D:1, B:1, A:1, G:2, C:2. Then, plug-ins J and I can be executed, for example, in parallel. Since plug-in G depended on both plug-ins J and I, its dependency count is decremented to a value of zero. A re-sort yields H:0, G:0, F:1, E:1, D:1, B:1, A:1, C:2. Then, plug-ins H and G can be executed, for example, in parallel. This will cause the counters for each of plug-ins E, F, and D to be decremented by a single count. Another re-sort yields F:0, E:0, D:0, B:1, A:1, C:2. Then, plug-ins F, E, and D can be executed, for example, in parallel. This will cause the counter for plug-in C to become zero. Yet another re-sort yields C:0, B:1, A:1. Then, plug-in C can be executed. This will cause the counter for plug-ins A and B to be decremented to zero. A re-resort this time yields B:0, A:0. Finally, both plug-ins B and A can be executed, for example, in parallel.

Accordingly, a method of processing plug-ins can be efficiently implemented in accordance with this aspect of the invention to reflect dependencies between plug-ins while taking advantage of multi-threading operation within the stage.

H) Conventional Computer System

Figure 7:
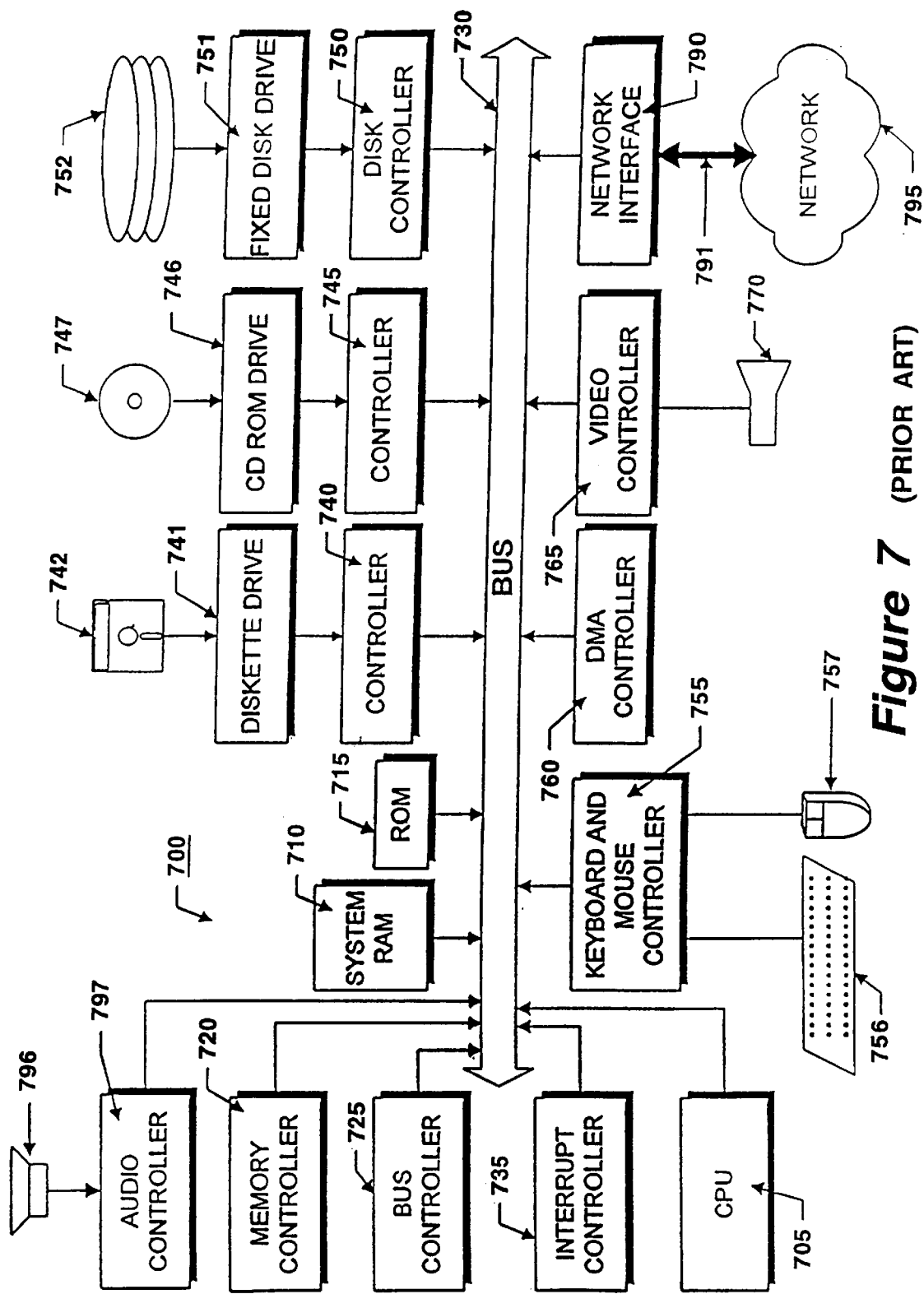
FIG. 7 is a block diagram of the architecture of a conventional computer system.

FIG. 7 illustrates a conventional system architecture for an exemplary computer system 700, with which servers 114, 116, the presentation server 140, configuration manager 150, 602, and individual machines 302, 304, 306 can be implemented. The exemplary computer system of FIG. 7 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 7.

The computer system 700 includes a central processing unit (CPU) 705, which may include a conventional microprocessor, random access memory (RAM) 710 for temporary storage of information, and read only memory (ROM) 715 for permanent storage of information. A memory controller 720 is provided for controlling system RAM 710. A bus controller 725 is provided for controlling bus 730, and an interrupt controller 735 is used for receiving and processing various interrupt signals from the other system components.

Mass storage may be provided by diskette 742, CD-ROM 747, or hard disk 752. Data and software may be exchanged with client computer 700 via removable media, such as diskette 742 and CD-ROM 747. Diskette 742 is insertable into diskette drive 741, which is connected to bus 730 by controller 740. Similarly, CD-ROM 747 is insertable into CD-ROM drive 746, which is connected to bus 730 by controller 745. Finally, the hard disk 752 is part of a fixed disk drive 751, which is connected to bus 730 by controller 750.

User input to the computer system 700 may be provided by a number of devices. For example, a keyboard 756 and a mouse 757 may be connected to bus 730 by keyboard and mouse controller 755. An audio transducer 796, which may act as both a microphone and a speaker, is connected to bus 730 by audio controller 797. It should be obvious to those reasonably skilled in the art that other input devices, such as a pen and/or tablet and a microphone for voice input, may be connected to client computer 700 through bus 730 and an appropriate controller. DMA controller 760 is provided for performing direct memory access to system RAM 710. A visual display is generated by a video controller 765, which controls video display 770.

Computer system 700 also includes a network adapter 790 that allows the client computer 700 to be interconnected to a network 795 via a bus 791. The network 795, which may be a local area network (LAN), a wide area network (WAN), or the Internet, may utilize general-purpose communication lines that interconnect multiple network devices.

Computer system 700 generally is controlled and coordinated by operating system software. Among other computer system control functions, the operating system controls allocation of system resources and performs tasks such as process scheduling, memory management, networking and I/O services.

A software implementation of components of the above-described embodiment may comprise computer instructions and routines either fixed on a tangible medium, such as a computer-readable media, e.g. the diskette 742, CD-ROM 747, ROM 715, or fixed disk 752 of FIG. 1, or transmittable via a modem or other interface device, such as communications adapter 790 connected to the network 795 over a medium 791. Medium 791 can be either a tangible medium, including but not limited to optical or hard-wire communications lines, or may be implemented with wireless techniques, including but not limited to microwave, infrared or other transmission techniques. It may also be the Internet. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

In the illustrative embodiment described above, the computer-executable programs (e.g., the plug-ins and the framework) that are part of the metering and processing system 100 and the data processed thereby can be implemented using object-oriented programming techniques. As will be understood by those skilled in the art, Object Oriented Programming (OOP) techniques involve the definition, creation, use and destruction of "objects". These objects are software entities comprising data elements, or attributes, and methods, or functions, which manipulate the data elements The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

The benefits of object technology arise out of three basic principles, namely, encapsulation, polymorphism and inheritance. Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is "many shapes, one interface". A software component can make a request of another component without knowing exactly what that component is. The component that receives the request interprets it and figures out, according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims.

What is claimed is:

1. A system for processing metered information, the system comprising:
   A) a mechanism for converting the metered information into session data; and
   B) a processing unit for performing calculations on the session data to generate processed session data, the processing unit comprising an execution management framework, and a plurality of processing modules for processing the session data as directed by the framework to perform the calculations.

2. The system in accordance with claim 1, further comprising a configuration manager for generating a configuration file for specifying at least one operational parameter for the processing modules.

3. The system in accordance with claim 2, wherein the configuration file specifies at least one operational parameter including an order of operation of the processing modules.

4. The system in accordance with claim 2, wherein the configuration file specifies at least one operational parameter including a computational operation for each of the processing modules.

5. The system in accordance with claim 2, wherein the configuration manager includes a user interface for receiving operator-specified configuration parameters, including an order of operation for the processing modules in accordance with data consumer requirements.

6. The system in accordance with claim 2, wherein the configuration files specify a configuration for the processing unit, the configuration including an identification of processing modules and an order for execution of the processing modules.

7. The system in accordance with claim 6, wherein the session data includes a time stamp, and the configuration manager provides a configuration to the processing unit responsive to the time stamp.

8. The system in accordance with claim 7, wherein the configuration manager provides a first configuration to the processing unit responsive to the time stamp indicating a time prior to a specified time, and provides a second configuration to the processing unit responsive to the time stamp indicating a time after the specified time.

9. The system in accordance with claim 1, wherein the processing unit includes a pipeline for performing calculations on the session data to generate processed session data, the pipeline comprising a plurality of stages, each of the stages by including an execution management framework and a plurality of processing modules for processing the session data as directed by an associated one of the execution management frameworks to perform the calculations.

10. The system in accordance with claim 9, further comprising a configuration manager for generating a configuration file for specifying at least one operation parameter for the processing modules, wherein the configuration files includes stage configuration files for defining computational dependencies between the stages.

11. The system in accordance with claim 9, further comprising queues interposed between the stages, and wherein the stages execute the processing modules non-synchronously.

12. The system in accordance with claim 1, further comprising a presentation apparatus for providing processed session data to data consumer.

13. The system in accordance with claim 1, in combination with a metering apparatus for collecting the metered user information.

14. The system in accordance with claim 1, wherein the session data includes property name/value pairs, and the processing modules perform operations including mathematical operations, on the property name/value pairs to obtain a set of processed session data.

15. The system in accordance with claim 1, wherein the processing modules comprise modular, computer-executable computer programs that specify a specific computational operation with respect to the session data.

16. The system in accordance with claim 1, wherein the processing modules can operate in an operator-specified order within the pipeline.

17. The system in accordance with claim 1, wherein the processing modules can be added, removed, and replaced for modifying the calculation performed by the pipeline in generating processed session data.

18. The system in accordance with claim 1, further comprising an operational order determining mechanism for tracking an order of operation of the processing modules.

19. The system in accordance with claim 18, wherein the operational order determining mechanism includes a dependency counter associated with each processing order for determining a operational sequence position for operation of the associated processing module.

20. The system in accordance with claim 18, wherein each processing unit includes a dependency counter, and commences operation when the counter reaches a predetermined count.

21. The system in accordance with claim 20, further comprising means for decrementing the counter included in one of the processing units in response to operation another of the processing units.

22. The system in accordance with claim 1, wherein the processing modules include a set processing module for operating on a set of the session data from a number of transactions as a batch.

23. The system in accordance with claim 1, wherein the processing modules include a fork processing module for changing the order of processing of the session data.

24. The system in accordance with claim 1, wherein the processing modules include an aggregation processing module for aggregating session data.

25. A method for processing metered information pertaining to a communication service, the method comprising:

A) converting the metered information into session data; and

B) performing calculations on the session data to generate processed session data using a processing unit, the performing step comprising using a framework for managing processing, and using a plurality of processing modules for processing the session data as directed by the framework to perform the calculations.

26. The method in accordance with claim 25, further comprising a configuration manager generating a configuration file for specifying a plurality of operational parameters for the processing modules including an order of operation of the processing modules and a computational operation for each of the processing modules.

27. The method in accordance with claim 26, wherein the configuration manager includes a user interface for receiving operator-specified configuration parameters, including an order of operation for the processing modules in accordance with data consumer requirements.

* * * * *